US010545887B2

(12) United States Patent
Mirza et al.

(10) Patent No.: US 10,545,887 B2
(45) Date of Patent: Jan. 28, 2020

(54) MULTIPLE LINKED LIST DATA STRUCTURE (71) Applicant: ATI Technologies ULC, Markham (CA)

(72) Inventors: Jimshed Mirza, Toronto (CA); Qian Ma, Toronto (CA)

(73) Assignee: ATI Technologies ULC, Markham (CA)

( * ) Notice: Subject to any disclaimer, the term of this patent is extended or adjusted under 35 U.S.C. 154(b) by 37 days.

(21) Appl. No.: 15/442,402

(22) Filed: Feb. 24, 2017

(65) Prior Publication Data
US 2018/0246820 A1 Aug. 30, 2018

(51) Int. Cl.
G06F 13/16 (2006.01)

(52) U.S. Cl.
CPC ...... G06F 13/1642 (2013.01); G06F 13/1673 (2013.01)

(58) Field of Classification Search
CPC .................. G06F 13/1642; G06F 13/1673
USPC ...................... 710/52–53, 56, 310
See application file for complete search history.

(56) References Cited

U.S. PATENT DOCUMENTS

| 5,535,197 | A  | * | 7/1996  | Cotton    | H04L 12/5601 370/395.72 |
| 6,124,868 | A  | * | 9/2000  | Asaro     | G06F 9/3879 345/503 |
| 6,266,744 | B1 |   | 7/2001  | Hughes et al. | |
| 9,977,609 | B2 |   | 5/2018  | Jayasena et al. | |
| 2003/0218592 | A1 | * | 11/2003 | Cho       | G09G 3/3611 345/89 |
| 2004/0049601 | A1 | * | 3/2004  | Boyd      | H04L 47/10 709/250 |
| 2006/0059242 | A1 | * | 3/2006  | Blackmore | G06F 12/1081 709/211 |
| 2007/0157200 | A1 | * | 7/2007  | Hopkins   | G06F 9/52 718/100 |
| 2012/0307838 | A1 | * | 12/2012 | Manula    | H04L 49/358 370/412 |
| 2014/0164670 | A1 | * | 6/2014  | Voorhees  | G06F 13/4022 710/316 |
| 2016/0006665 | A1 | * | 1/2016  | Lamb      | H04L 47/622 370/412 |
| 2018/0052780 | A1 | * | 2/2018  | Khatib    | G06F 5/065 |

* cited by examiner

Primary Examiner — Farley Abad
Assistant Examiner — Henry W Yu
(74) Attorney, Agent, or Firm — Meyertons Hood Kivlin Kowert and Goetzel PC; Rory D. Rankin (57) ABSTRACT A system and method for maintaining information of pending operations are described. A buffer uses multiple linked lists implementing a single logical queue for a single requestor. The buffer maintains multiple head pointers and multiple tail pointers for the single requestor. Data entries of the single logical queue are stored in an alternating pattern among the multiple linked lists. During the allocation of buffer entries, the tail pointers are selected in the same alternating manner, and during the deallocation of buffer entries, the multiple head pointers are selected in the same manner.

20 Claims, 5 Drawing Sheets

MULTIPLE LINKED LIST DATA STRUCTURE

BACKGROUND

Description of the Relevant Art

Modern microprocessors buffer a variety of information during processing of software applications. Requests, results or responses, changing status information for instructions during intermediate processing steps of the instructions, and so on are stored in buffers. In some embodiments, designers determine an ideal number of buffer entries for a requestor which balances performance with on-die area and power consumption. However, with multiple requestors, providing a separate buffer for each of the multiple requestors consumes an appreciable amount of on-die area, especially as each of the number of requestors and the number of buffer entries increase.

In addition, the resource usage becomes inefficient when one or more requestors are relatively idle while other requestors are active. The active requestors are unable to access the storage resources dedicated to the idle requestors. Using a single buffer divided into portions, each portion being dedicated to one of the multiple requestors, has the same disadvantages regarding on-die area and inefficient usage of resources.

In some examples, the entries of a single buffer are allocated dynamically for efficient use of the storage resources by multiple requestors. However, a search operation for allocating an entry or deallocating an entry uses a content-addressable-memory (CAM) comparison of identifying information for the requestor and its request with particular fields in each entry in the single buffer. CAM match comparisons use dynamic logic which consumes a relatively high amount of power as well as affects the processor's clock period. Additionally, there is no relationship with dynamic allocation between an allocated buffer entry and the processing order with respect to other allocated buffer entries storing information for a same requestor.

A linked list is a linear data structure implemented in hardware allowing dynamic allocation of buffer entries for different requestors. The number of buffer entries to be used by a requestor is not fixed and the number increases and decreases based on activity levels. Each entry or node within the linked list stores at least data for the entry and a next pointer indicating a location storing the next entry or node in the linked list. The entry point providing access into the linked list is a head pointer storing an indication of the location storing the first entry or node.

Direct access to individual entries in a linked list is not supported. Rather, the linked list is traversed beginning at the head or the currently first entry using the head pointer followed by accessing the next pointer in the current entry before accessing the next entry. When the latency of accessing the next pointer exceeds a clock cycle, it is no longer possible to stream accesses of the entries in back-to-back clock cycles. Thus, performance degrades.

In view of the above, efficient methods and systems for maintaining information of pending operations are desired.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, entries shown in the figures have not necessarily been drawn to scale. For example, the dimensions of some of the entries are exaggerated relative to other entries.

Methods and systems for maintaining information of pending operations are contemplated. A buffer uses multiple entries for the storage of a variety of information during processing of software applications. Requests, results or responses, changing status information for instructions during intermediate processing steps, and so on are stored in the multiple entries. One or more requestors access the information stored in the multiple entries. In various embodiments, the buffer uses multiple linked lists implemented in hardware for each of the one or more requestors allowing dynamic allocation of the buffer entries.

The number of linked lists implemented for a particular requestor is based on a desired increase in throughput. For example, if the buffer has a latency of two clock cycles, then, in various embodiments, designers design the buffers to double throughput in order to reduce the latency to one clock cycle. The increased throughput supports streaming accesses of the entries stored in the buffer entries in back-to-back clock cycles. The buffer, in this case, includes two linked lists for the particular requestor. The two linked lists are maintained in such a manner to implement one single logical data structure. In this manner, adding to and removing entries from the data structure treat the data structure as having a single head and a single tail, even though it may be implemented using two or more linked lists that are not linked to one another (i.e., no entries in one linked list point to an entry in another linked list).

The buffer maintains two head pointers and two tail pointers for the two linked lists. The buffer uses control logic for selecting which head pointer and which tail pointer corresponds at a given time to the head pointer and the tail pointer of the single logical data structure for the particular requestor. Despite the two clock cycle latency, accesses are streamed in back-to-back clock cycles for allocating and deallocating buffer entries. In one embodiment, the data entries of the single logical data structure in memory are stored in an alternating pattern between the two linked lists. Therefore, during the allocation of buffer entries, the tail pointers are selected in a round robin manner, which resorts to alternating between the tail pointers. Similarly, during the deallocation of buffer entries, the two head pointers are selected in an alternating manner.

Should the latency of the buffer be three clock cycles, then, in various embodiments, designers design the buffers to triple throughput in order to reduce the latency to one clock cycle. The increased throughput supports streaming accesses of the entries stored in the buffer entries in back-to-back clock cycles. The buffer, in this case, includes three linked lists for the particular requestor. In various embodiments, the three linked lists are maintained in such a manner to implement one single logical data structure. For example, the buffer maintains three head pointers and three tail pointers. In some embodiments, the pointers are accessed in a round robin manner during the allocation and deallocation of buffer entries.

Figure 1:
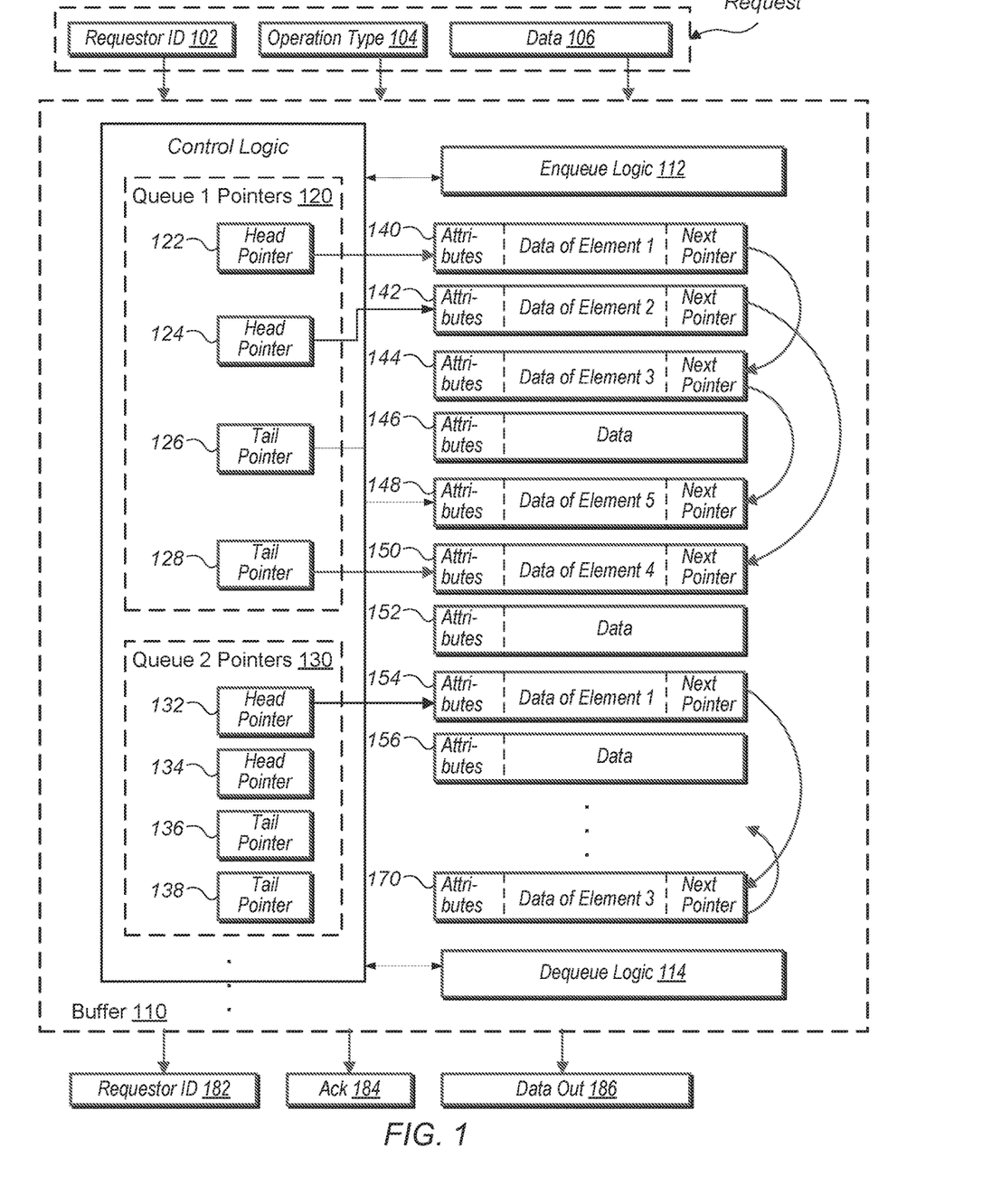
FIG. 1 is a generalized diagram of one embodiment of a buffer.

Turning now to FIG. 1, one embodiment of a buffer is shown. As shown, the buffer 110 uses buffer entries 140-170 for storing information, at least queue 1 pointers 120 and queue 2 pointers 130 for identifying particular entries of the buffer entries 140-170, and enqueue logic 112 and dequeue logic 114 for allocating and deallocating entries of the buffer entries 140-170. In various embodiments, the pointers 120 and 130 are maintained by control logic associated with the buffer 110. Pointers 120 and 130, enqueue logic 112, and dequeue logic 114 form at least part of the control logic of the buffer 110. The buffer 110 receives a requestor identifier (ID) 102 for identifying a particular requestor of one or more requestors conveying an access request. Additionally, the buffer 110 receives an operation type 104 for identifying whether the access request is writing information or reading information, and data in 106 for providing write data for a write request. In one embodiment, the components 102-106 correspond to a single request received by the buffer 110.

The buffer 110 conveys a requestor ID 182 for identifying a particular requestor of one or more requestors receiving a result of an access request. The buffer 110 also conveys an acknowledgment (Ack) 184 for providing a status of the operation corresponding to the access request, and data out 186 for providing desired data for a read request. In various embodiments, each of the entries 140-170 is capable of being allocated for use by the one or more requestors with access to the buffer 110. In some embodiments, no limit is set for any of the one or more requestors accessing the buffer 110.

The received requestor ID 102 is used to select one of the queue 1 pointers 120 and queue 2 pointers 130 during the processing of a received access request. Each of the enqueue logic 112 and dequeue logic 114 updates any counters (not shown) and the selected pointers of the queue 1 pointers 120 and queue 2 pointers 130 during the allocation and deallocation of the entries 140-170. The received operation type 104 determines whether the enqueue logic 112 or the dequeue logic 114 is used during the processing of the received access request.

One of a variety of memory circuits is used for implementing the entries 140-170. In various embodiments, the entries 140-170 include static random access memory (SRAM) for storing data. Each of the entries 140-170 is capable of storing the same type of information. In some embodiments, the information stored in an allocated entry includes an attributes field, data for an entry in a linked list, and a next pointer. In some embodiments, the attributes field stores a variety of information associated with a received access request such as a valid bit, a source ID which is the requestor ID in some embodiments, an application ID, a cache tag or other indication of a memory address, a priority level, a quality-of-service parameter, and so forth. In some embodiments, a pool of entries may be available for use as entries of linked lists and allocated or deallocated as needed using free lists or some other mechanism. In other embodiments, entries of the linked lists are dynamically allocated by allocating memory for then as needed and deallocated to free memory. Entries may be of a fixed and/or variable size. In the example shown, entries 146, 150 and 156 represent entries that are not currently being used as part of a linked list. These entries may remain allocated for reuse as needed, or their memory may be reclaimed as desired. These and other embodiments are possible and are contemplated.

The data for an entry of a linked list stores data for a variety of applications such as multimedia, business and finance, medical, education and so on. In other embodiments, the data for an entry of a linked list stores information corresponding to instructions being processed such as an opcode, an age, a thread ID, source and destination IDs and so on. In some embodiments, one or more of the values stored in the attributes field is stored in the data field and vice-versa. Other examples of information stored in the attributes field and the data field are possible and contemplated.

The next pointer field in an entry stores an indication of one other of the entries 140-170 for storing information of a next access request received after the access request corresponding to the entry. The next entry is allocated based on whether a next access request was already received. The indication stored in the next pointer field provides in-order allocation of the entries 140-170 based on the order the access requests are received by the buffer 110. In some embodiments, the next pointer field stores an entry number identifying one of the entries 140-170.

In various embodiments, when a first requestor is active, one or more of the entries 140-170 are allocated for use by the first requestor beginning at a selected available entry. One of a variety of methods for selecting a next available entry of the entries 140-170 is used by the enqueue logic 112. In the illustrated embodiment, the entry 140 is a head entry for the first requestor and the queue 1 pointers 120 is used for identifying entries corresponding to the first requestor. As shown, the first requestor has allocated entries 140-144 and 148-150. The head pointer 122 of the queue 1 pointers 120 stores an indication of entry 140.

The queue 1 pointers 120 includes a second head pointer, which is head pointer 124, for identifying entries allocated for use by the first requestor. The head pointer 124 stores an indication of the entry 142. It is noted the next pointer field of entry 140, which is the first entry allocated for the first requestor, does not identify the entry 142 as the next access request received after the access request corresponding to entry 140. Rather, the next pointer field of entry 140 identifies the entry 144, which is the third entry allocated for the first requestor. In a similar manner, the next pointer field of entry 144 identifies the entry 148, which is the fifth entry allocated for the first requestor, and not the fourth or next consecutive allocated entry after the third entry. Instead, the next pointer field of entry 142 identifies the entry 150, which is the fourth entry allocated for the first requestor.

The head pointer 122 is used to identify the entry 140, which is the head of a first linked list for the first requestor. The tail pointer 126 is used to identify the entry 148, which is the tail of the first linked list for the first requestor.

Similarly, the head pointer 124 is used to identify the entry 142, which is the head of a second linked list for the first requestor. The tail pointer 128 is used to identify the entry 150, which is the tail of the second linked list for the first requestor. Therefore, the queue 1 pointers 120 is used to identify the heads and tails of the two linked lists associated with the first requestor. At a given time, only one of the at least two head pointers 122 and 124 identifies a head of the single logical data structure, and only one of the at least two tail pointers 126 and 128 identifies a tail of the single logical data structure.

In the illustrated embodiment, when entries are allocated for the first requestor, the enqueue logic 112 alternates between the two head pointers 122 and 124. When a first entry is inserted in a respective empty linked list, in some embodiments, the head pointer 122 is selected by the enqueue logic 112 to indicate the head of the single logical data structure. The enqueue logic 112 also selects the tail pointer 126 to indicate the tail corresponding to the head indicated by the head pointer 122. Afterward, the enqueue logic 112 alternates between the two tail pointers 126 and 128 as more entries are added for the first requestor. When entries are deallocated for the first requestor, the dequeue logic 114 alternates between the two head pointers 122 and 124. Therefore, the logic 112 and 114 alternate between the at least two linked lists when accessing the single logical data structure in the memory.

For a second requestor, the pointers 132-138 in the queue 2 pointers 130 are used. As shown, the head pointer 132 is used to identify the entry 154, which is the head of a first linked list for the second requestor. The next pointer field of entry 154 identifies the entry 170, which is the third entry allocated for the second requestor. If more requestors are permitted to access the buffer 110, more queue pointers other than the queue 1 pointers 120 and the queue 2 pointers 130 are supported. The number of requestors and queue pointers is set by design needs for the buffer 110.

By maintaining a single logical data structure for a particular requestor by supporting two linked lists for the particular requestor, the throughput increases. For example, when the access latency for the buffer 110 is two clock cycles, the buffer 110 still supports streaming read accesses in back-to-back clock cycles. For example, the deallocation (read request) of the first entry in entry 140 for the first requestor is immediately followed by the deallocation (read request) for the second entry in entry 142. In the immediate following clock cycle, the next pointer in the entry 140 is known and the deallocation (read request) of the third entry in entry 144 is sent. Similarly, in the next immediate clock cycle, the next pointer in the entry 142 is known and the deallocation (read request) of the fourth entry in entry 150 is sent. The dequeue logic 114 alternates between the updated head pointers 122 and 124 while deallocating entries.

Should the latency of the buffer be three clock cycles, then, in various embodiments, the buffer 110 would include three head pointers and three tail pointers in each queue pointers for supporting three linked lists used to implement one single logical data structure for a particular requestor. As the access latency increases, so would the number of linked lists used to implement one single logical data structure for the particular requestor.

In some embodiments, one or more of the enqueue logic 112 and the dequeuer logic 114 maintains a respective count of valid data entries of the single data structure for each of the requestors. The count is incremented when entries are added (written/enqueued) and a selected tail pointer in a corresponding one of the queue 1 pointers 120 and the queue 2 pointers 130 is updated. The count is decremented when entries are removed (read/dequeued) and a selected head pointer in a corresponding one of the queue 1 pointers 120 and the queue 2 pointers 130 is updated.

In addition, the throughput relies on the number of ports used for the buffer 110. In the above examples, a single port is used. However, in other embodiments, two or more ports are used. The throughput is based on the number of available ports and the access latency of the memory. When the throughput of the buffer 110 causes the buffer 110 to be in the critical path of the chip design, using at least the queue 1 pointers 120 and the queue 2 pointers 130 and storage arrangement with multiple linked lists for a particular requestor increases the throughput for accesses of the buffer 110.

In various embodiments, the head of the linked list for queues is the oldest data entry, whereas the tail is the youngest data entry. Therefore, head pointers store an indication of the storage location storing the oldest data entry of a corresponding linked list, whereas tail pointers store an indication of the storage location storing the youngest data entry of the corresponding linked list. In various embodiments, the single logical data structures and the corresponding multiple linked lists used to construct the structures are first-in-first-out structures. In these embodiments, the single logical data structure is a single logical queue. In other embodiments, the single logical data structures and the corresponding multiple linked lists used to construct the structures are last-in-first-out structures. In these embodiments, the single logical data structure is a single logical stack.

Figure 2:
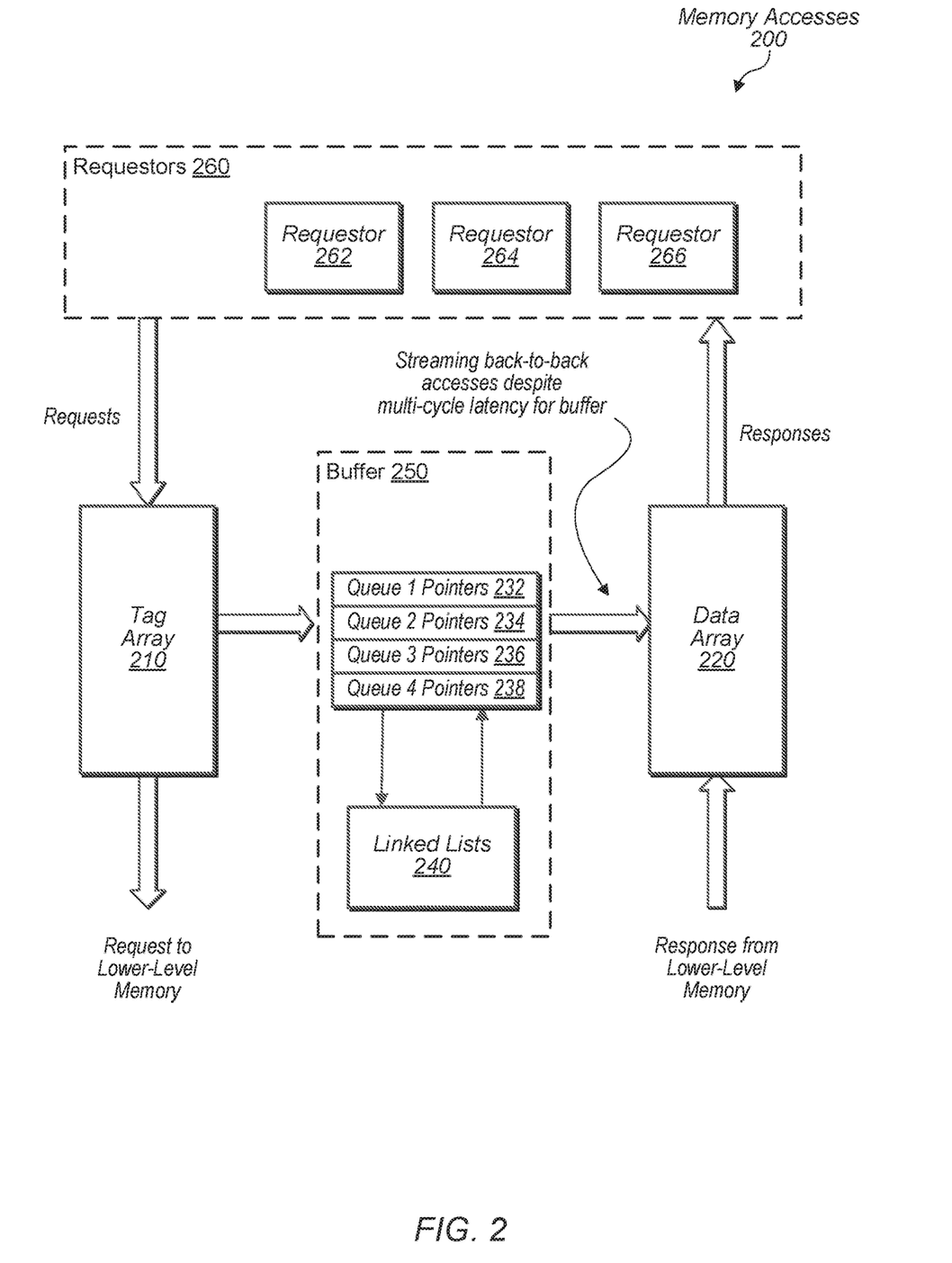
FIG. 2 is a generalized diagram of one embodiment of memory accesses.

Turning now to FIG. 2, one embodiment of memory accesses 200 is shown. As shown, a cache uses a tag array 210 and a corresponding data array 220. Control logic for access, control and coherency steps as well as queues for storing requests and responses and registers for storing control and status information are not shown for ease of illustration. The tag array 210 and the data array 220 are placed in one of a variety of levels of a memory hierarchy. For example, in some embodiments, the tag array 210 and the data array 220 are used as a level-one (L1) data cache. In other embodiments, the tag array 210 and the data array 220 are used as an L2 or L3 data cache. In yet other embodiments, the tag array 210 and the data array 220 are used as an instruction cache. The requestors 262-266 within the requestors 260 access data stored within the data array 220.

Although three requestors are shown in requestors 260, in other embodiments, one, two or any other number of requestors generate access requests targeting data stored in the data array 220. Each of the one or more requestors 262-266 is one of a processor or a functional unit. In various embodiments, one or more of the requestors 262-266 are processor cores within one or more of a general-purpose central processing unit (CPU) and a highly parallel data architecture processor such as a graphics processing unit (GPU), a digital signal processor or other.

In some embodiments, one or more of the requestors 262-266 are functional units on individual dies on a system on a chip (SOC) or within a package. The functional units are used for a variety of data processing such as audio and video data processing. The requestors 262-266 convey the access requests through one or more buses or a communication fabric supporting multiple communication protocols. Arbitration logic is used to send generated access requests from the requestors 262-266 to the tag array 210 and the data array 220. Responses for the requests are later sent from the data array 220 to the requestors 262-266. In some embodiments, polling logic is used to aid the transfer of responses to the requestors 262-266. The interfaces, routing, and logic for arbitration are not shown for ease of illustration.

One of a variety of storage arrangements is used by the tag array 210 and the data array 220 such as a direct-mapped, a fully associative or a set-associative arrangement. For a set-associative arrangement, a 4-way, 8-way, or another number of ways is supported by the tag array 210 and the data array 220. As used herein, each of the terms "cache block" and "cache line" is interchangeable. Similarly, each of the terms "cache tag", "cache line tag", and "cache block tag" is interchangeable. A cache line is a set of bytes stored in contiguous memory locations, which are treated as a unit for coherency purposes. In some embodiments, the cache line is the unit of allocation and deallocation in the data array 220. One of a variety of a number of bytes is used for the size of the cache line.

In various embodiments, the data array 220 stores state information for each cache block such as one or more of a valid bit, a cache block owner encoding that indicates the source which owns the corresponding cache block, Least Recently Used (LRU) eviction information used in association with a cache replacement algorithm employed by a cache controller, an indication that designates a cache coherency state such as modified, exclusive, owned, shared, invalid, or other. Other included state information is possible and contemplated.

A given cache set is selected from other sets in the data array 220 by a block index portion of a received address used to access the set-associative cache. A cache block hit occurs when the block tags in the received address and the block tags stored in the tag array 210 contain a same value and state information in the tag array 210 designates a valid address for valid data in the data array 220. A cache block miss occurs when a mismatch occurs between the block tags or the state information in the tag array 210 designates an invalid address for data in the data array 220. In this case, a request is conveyed to lower-level memory to retrieve the cache block corresponding to the received access request.

The cache block hit/miss status is combined with information from the received access request and stored in the buffer 250. For example, an entry of multiple entries used in the linked lists 240 is allocated for the information, whereas one of the sets of queue pointers 232-238 is used to identify the entry for allocation. In various embodiments, pointers 232-238 are maintained by control logic associated with the buffer. Although four sets of queue pointers 232-238 are shown, any number of sets of queue pointers are possible and contemplated for use in the buffer 250. The selected entry for allocation in the linked lists 240 stores one or more of the cache block hit/miss indication, the requestor ID, the access type, the tag address used to index into the tag array 210 and identifies a storage location in the data array 220, an application ID, and so on.

In some embodiments, each of the sets of queue pointers 232-238 includes multiple head pointers and multiple tail pointers for a particular requestor. As described earlier, the buffer 250 maintains two head pointers and two tail pointers for two linked lists used to implement a single logical data structure for a particular requestor. In other embodiments, the buffer 250 maintains a higher number (e.g., 3, 4, and so on) of head pointer and tail pointers for the same higher number (e.g., 3, 4, and so on) of linked lists used to implement a single logical data structure for a particular requestor. The buffer 250 uses control logic to select one of the queue 1 pointers 232, queue 2 pointers 234, queue 3 pointers 236 and queue 4 pointers 238 in addition to selecting which head pointer and which tail pointer within the selected set of queue pointers 232-238 corresponds at a given time to the head pointer and the tail pointer of the single logical data structure for the particular requestor. Despite a multiple clock cycle access latency for the linked lists 240, accesses are streamed in back-to-back clock cycles to the buffer 250 for allocating and deallocating entries in the linked lists 240.

Arbitration logic (not shown) selects one of the requestors 262-266 for conveying accesses to the data array 220 from the buffer 250. In some embodiments, a number of access requests is also selected. For example, the arbitration logic selects requestor 264 and the corresponding queue 3 pointers 232-236. One or more entries in the linked list 240 are deallocated each clock cycle in a streaming back-to-back manner to convey streaming back-to-back access requests to the data array 220. As the information is stored in multiple linked lists used to implement a single logical data structure corresponding to the requestor 264, a separate linked list is accessed each clock cycle. Therefore, the dependency on next pointers between accesses is removed.

Figure 3:
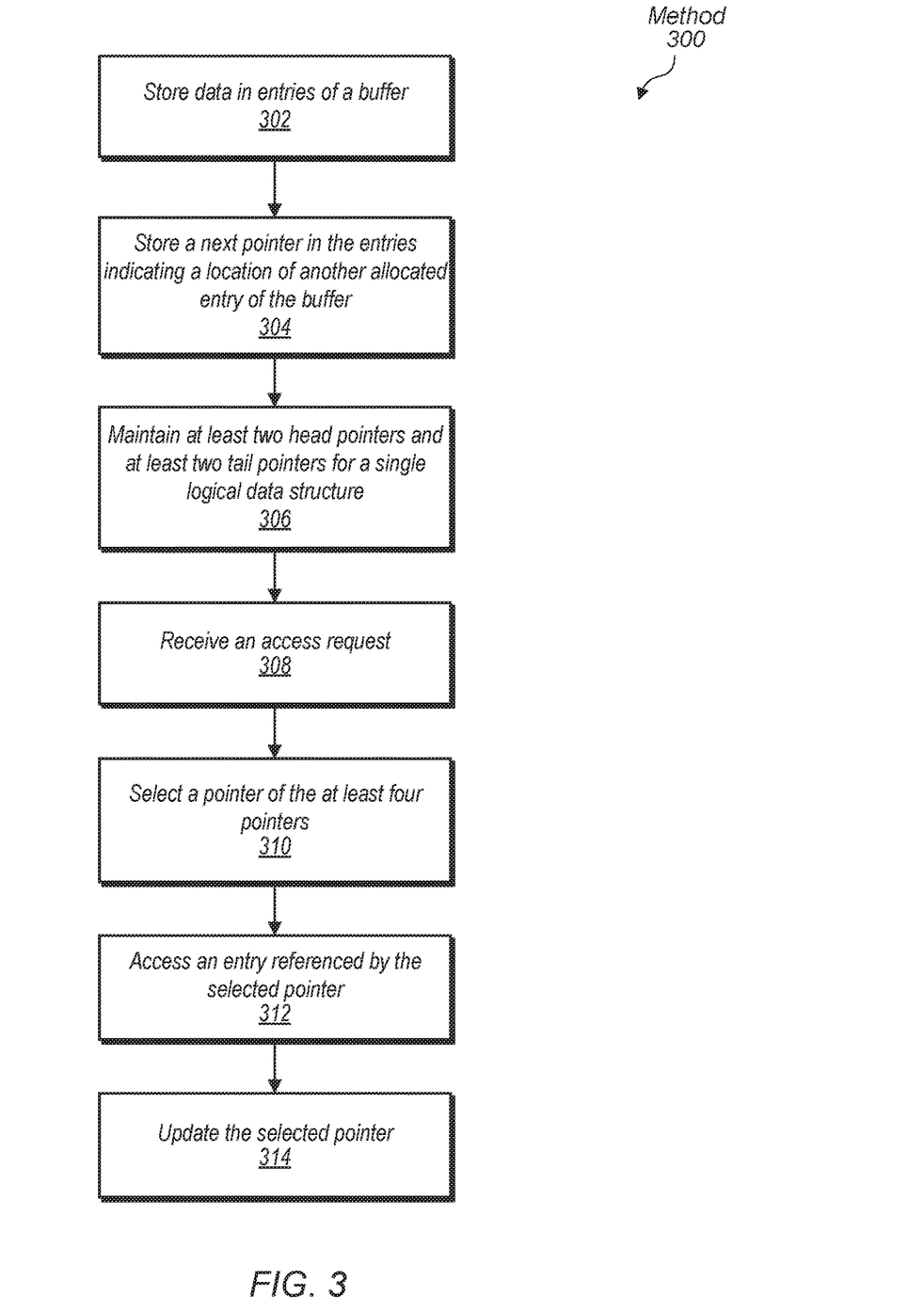
FIG. 3 is a generalized diagram of one embodiment of a method for accessing a buffer implementing multiple linked lists for a single requestor.

Referring now to FIG. 3, one embodiment of a method 300 for accessing a buffer implementing multiple linked lists for a single requestor is shown. For purposes of discussion, the steps in this embodiment (as well as in FIGS. 4 and 5) are shown in sequential order. However, in other embodiments some steps occur in a different order than shown, some steps are performed concurrently, some steps are combined with other steps, and some steps are absent.

Computing systems include one or more functional units, each capable of accessing memory for data. As the functionality of smartphones, tablet computers, multimedia players, desktop computers, servers and so forth increase, the demand for more data to process also increases. A buffer is provided for storing data in its entries (block 302). The data is one or more of a variety of data types such as requests, results or responses, changing status information for instructions during intermediate processing steps of the instructions, and so on.

A next pointer in the buffer entries indicates a location of another allocated entry of the buffer (block 304). Combinatorial logic within a control unit of the buffer maintains at least two head pointers and at least two tail pointers for a single logical data structure (block 306). In some embodiments, a single logical data structure is used by only a single requestor. In other embodiments, the logical data structure may be shared by multiple requestors. Therefore, a single logical data structure has multiple head pointers for indicating the head of the single logical data structure, and multiple tail pointers for indicating the tail of the single logical data structure. In various embodiments, the control unit maintains a same number of head pointers and tail pointers as the number of linked lists used to implement the single logical data structure for a particular requestor. For example, if the control unit supports two linked lists for implementing the single logical data structure for the particular requestor, then the control unit also supports two head pointers and two tail pointers.

The buffer receives an access request from a requestor (block 308). The control unit selects a pointer of the multiple pointers corresponding to the same requestor which sent the request (block 310). For example, one of the multiple head pointers is selected. Alternatively, one of the multiple tail pointers is selected. An entry referenced by the selected pointer is accessed in order to service the received access request (block 312). Afterward, the selected pointer is updated (block 314).

Figure 4:
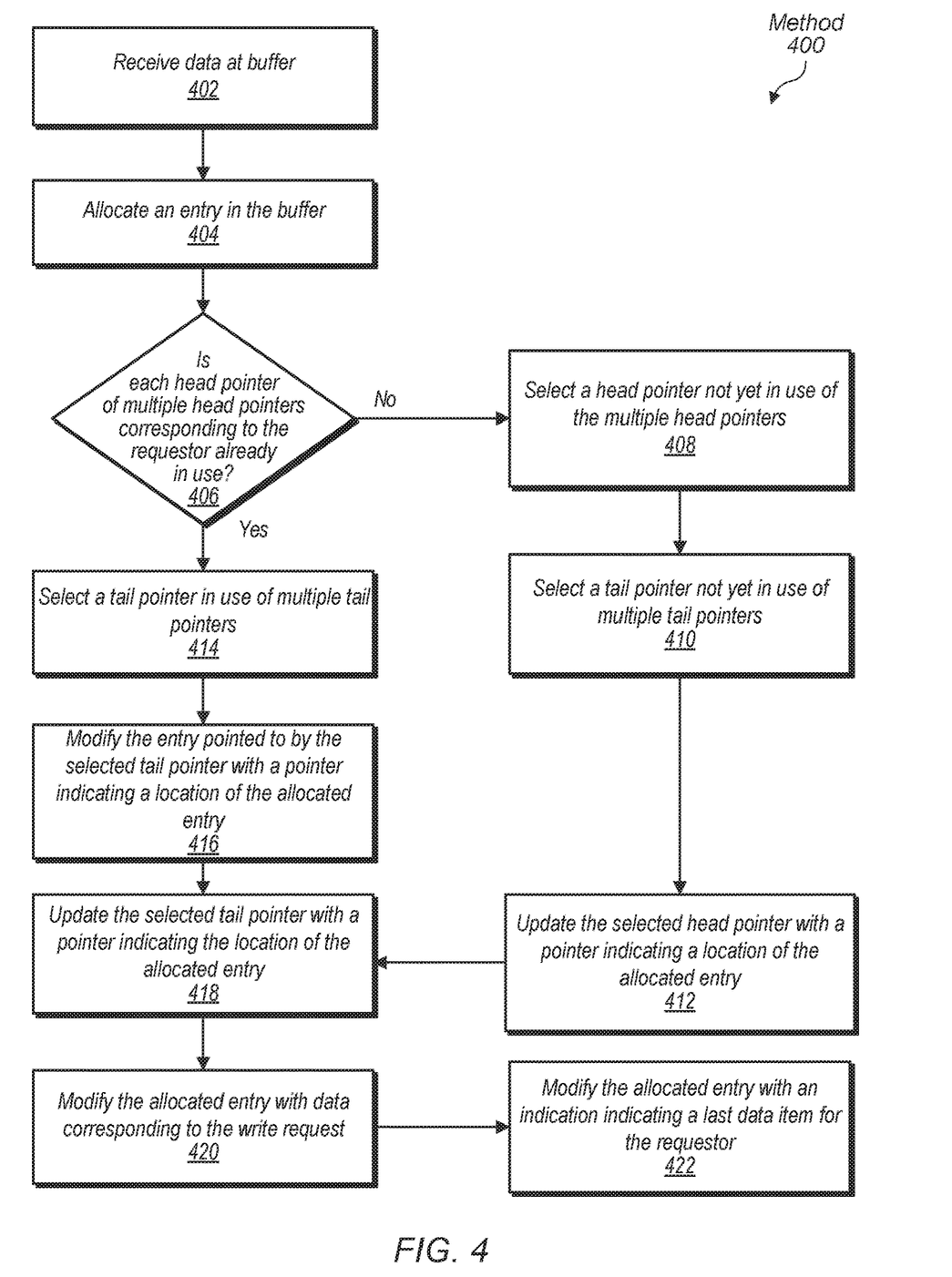
FIG. 4 is a generalized diagram of one embodiment of a method for processing a write request for a buffer implementing multiple linked lists for a single requestor.

Turning now to FIG. 4, one embodiment of a method 400 for storing data in a single logical data structure implemented using multiple linked lists is shown. In various embodiments, the data structure generally represents a buffer configured to store data corresponding to read and write requests received from one or more external requestors (e.g., requestors 262, 264, 266 of FIG. 2). In the example shown, data (e.g., corresponding to a received read or write request, or any other type of data) is received at the buffer (block 402). A control unit within the buffer selects or allocates an entry in the buffer for use in storing corresponding data (block 404). In embodiments in which the data corresponds to a read request, the data that is stored in the entry may include an indication that it is a read request and an address targeted by the read. If the data corresponds to a write request, the data that is stored may include an indication that it is a write request, write data, and an address where the data is to be stored.

The control unit in the buffer supports multiple linked lists for implementing a single logical data structure for the requestor. Therefore, the control unit maintains at least two head pointers, each indicating a head of one of the multiple linked lists, and maintains at least two tail pointers, each indicating a tail of one of the multiple linked lists. If each head pointer of the multiple head pointers corresponding to the requestor are not already in use ("no" leg of the conditional block 406), then a head pointer not yet in use of the multiple head pointers is selected (block 408). A tail pointer not yet in use of the multiple tail pointers is also selected (block 410). The selected head pointer and the selected tail pointer indicate the head and tail of a linked list to be allocated for the first time (i.e., the first entry of the linked list is allocated). The linked list is one of the multiple linked lists for the same requestor used to implement the single logical data structure for the requestor. The selected head pointer is then updated with a pointer indicating a location of the allocated entry (block 412).

If, on the other hand, each head pointer of the multiple head pointers corresponding are already in use ("yes" leg of the conditional block 406), then a tail pointer in use of the multiple tail pointers is selected (block 414). The tail pointer selected in this case will correspond to the linked list least recently added to. In other words, if the last entry allocated was for a first of two linked lists, then the tail pointer selected will correspond to the second of the two linked lists. In this manner, the allocations will alternate between the two linked lists. If more than two linked lists are used to implement the logical data structure, then selection of the pointer could be done in a round robin or other manner. Various such embodiments are possible and are contemplated. In various embodiments, control logic may include an indication as to which head pointer identifies an oldest entry of the logical data structure and which tail pointer identifies a youngest entry of the logical data structure.

Finally, the next pointer field of the entry identified by the tail pointer (i.e., the tail of the linked list before the new allocation) is then updated to store a pointer to the newly allocated entry (the new tail of the linked list) (block 416). The selected tail pointer is also updated to identify the newly allocated entry (block 418). The allocated entry is then modified with data corresponding to the write request (block 420). It is noted that the entry may be populated with the data corresponding to the write request at any time after allocation of the new entry. Finally, the allocated entry is updated with an indication indicating it is the last entry in the linked list (e.g., by storing a null pointer for the next pointer) (block 422).

Figure 5:
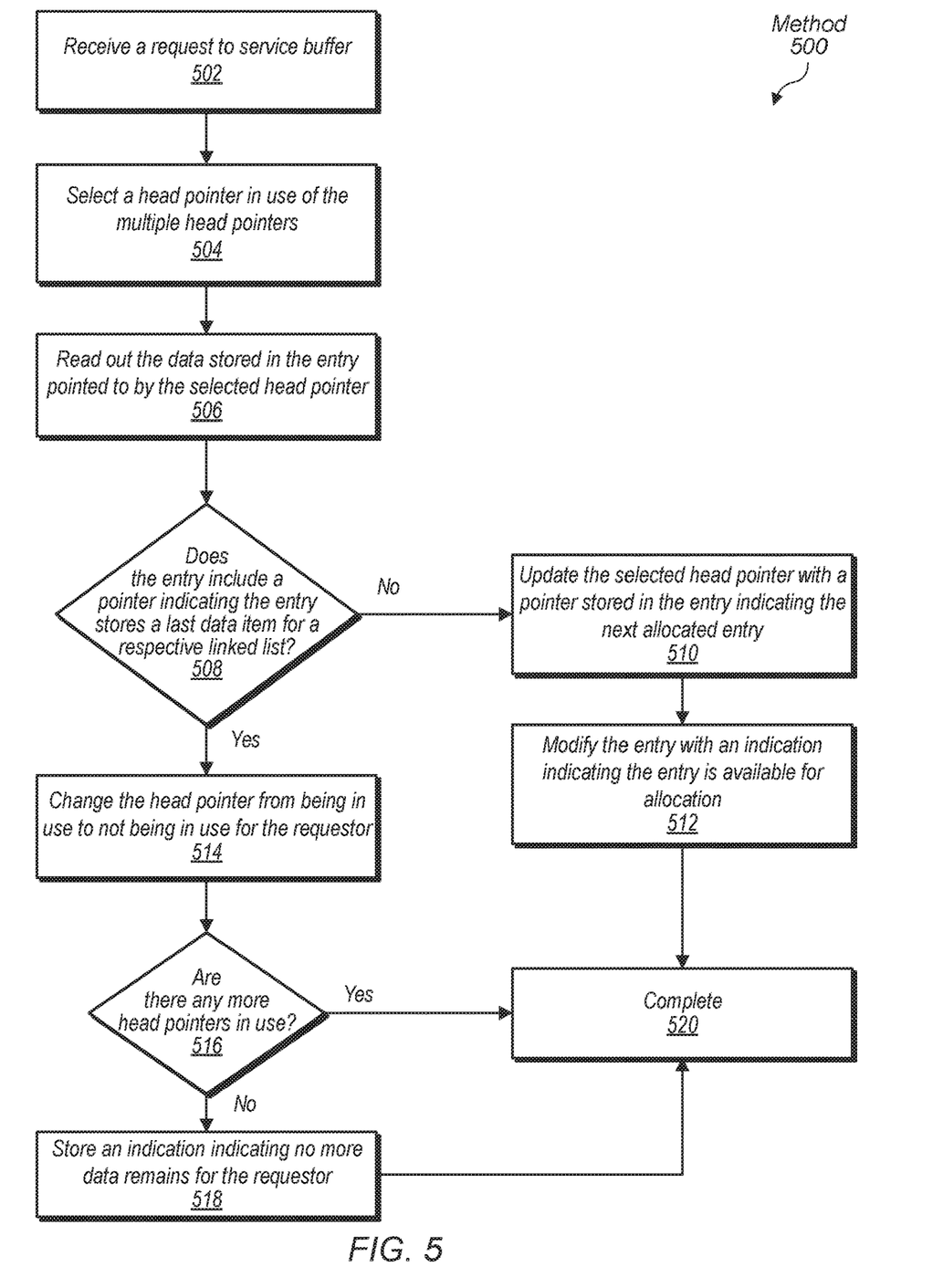
FIG. 5 is a generalized diagram of one embodiment of a method for processing a read request for a buffer implementing multiple linked lists for a single requestor.

Referring now to FIG. 5, one embodiment of a method 500 for servicing requests stored in a buffer implemented using multiple linked lists is shown. A buffer receives a request to retrieve data stored in the queue (block 502). In various embodiments, the request may come from dequeue logic associated with the buffer. For example, control logic may detect that there are one or more entries pending in the buffer (e.g., via a count being greater than zero). Responsive to this detection, the control logic may generate a "request" that causes the dequeue logic to service one or more entries in the buffer. Responsive to the request, control unit within the buffer selects a head pointer already in use of the multiple head pointers corresponding to the requestor (block 504). In various embodiments, the control unit maintains an indication of which head pointer in use currently stores the head of the single logical data structure. Depending on the embodiment, the head pointer may identify either the oldest or youngest entry of the logical data structure (e.g., depending on whether a first-in-first-out or last-in-first-out entity is implemented). Data stored in the entry pointed to by the selected head pointer is read out (block 506). If the data read out corresponds to a cache read or write, the data may be conveyed to cache read or write logic as appropriate. If the data read out corresponds to a process or other entity that seeks to consume or otherwise use the data, the data is conveyed to the process or other entity as appropriate.

If the entry identified by the selected head pointer includes a valid next pointer indicating the entry is not the last entry of the linked list ("no" leg of the conditional block 508), then the selected head pointer is updated with a pointer stored in the next pointer entry (block 510). For example, referring again to FIG. 1, if the head pointer 124 is selected and the data of entry 2 is read out from the entry 142, then the head pointer 124 is updated with the next pointer stored in the entry 142 and now points to the entry 150. In embodiments which utilize a pool of entries from which to allocate, an indication is stored to indicate that the entry is available (free) for allocation (block 512) and processing of the read request completes (block 520).

If the entry pointed to by the selected head pointer includes a next pointer indicating the entry stores a last data item for a respective linked list ("yes" leg of the conditional block 508), then the head pointer is changed from being in use to not being in use for the requestor (block 514). If there are any more head pointers in use for the requestor ("yes" leg of the conditional block 516), then processing the read request completes (block 520). However, if there are no more head pointers in use for the requestor ("no" leg of the conditional block 516), then an indication is stored indicating no more data remains for the requestor (block 518). For example, in some embodiments, the control unit for the buffer maintains a count of the number of data entries currently allocated for the single logical data structure. When the count reaches a given value, such as zero, an indication is stored (or the count itself) that indicates no more data entries remain. Afterward, processing the read request completes (block 520).

In various embodiments, after completing processing of the read request and conveying the requested data entry, the control unit updates an indication to indicate another head pointer other than the currently selected head pointer is to be used for a subsequent read request. Therefore, a first data entry of the single logical data structure identified by a first head pointer of at least two head pointers is retrieved, and for a subsequent read request, a second data entry of the single logical data structure identified by a second head pointer of the at least two head pointers and different from the first head pointer is retrieved. In addition, each of the first head pointer and the second head pointer is updated to identify a location identified by a next pointer stored in the first data entry and the second data entry, respectively.

In various embodiments, the head of the linked list for queues is the oldest data entry, whereas the tail is the youngest data entry. Therefore, head pointers store an indication of the storage location storing the oldest data entry of a corresponding linked list, whereas tail pointers store an indication of the storage location storing the youngest data entry of the corresponding linked list. In various embodiments, the single logical data structures and the corresponding multiple linked lists used to construct the structures are first-in-first-out structures. In these embodiments, the single logical data structure is a single logical queue. In other embodiments, the single logical data structures and the corresponding multiple linked lists used to construct the structures are last-in-first-out structures. In these embodiments, the single logical data structure is a single logical stack. It is noted that the methods and mechanisms described earlier are capable of being applied to both the first-in-first-out structures as well as the last-in-first-out structures.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A buffer comprising:
    a memory comprising a plurality of storage locations configured to store entries of one or more data structures;
    a first plurality of pointers configured to store at least two head pointers and two tail pointers corresponding to at least two linked lists in the memory, wherein the first plurality of pointers correspond to a first single requestor, wherein the at least two linked lists correspond to a single logical data structure in the memory, wherein each entry of the single logical data structure is configured to store a requestor identifier of the first single requestor; and
    control logic configured to alternate between the at least two linked lists when accessing the single logical queue in the memory.

2. The buffer as recited in claim 1, wherein only one of the at least two head pointers identifies a head of the single logical data structure, and only one of the at least two tail pointers identifies a tail of the single logical data structure.

3. The buffer as recited in claim 1, wherein the single logical data structure is one of a single logical queue and a single logical stack.

4. The buffer as recited in claim 1, wherein the buffer further comprises a second plurality of pointers configured to store at least two head pointers and two tail pointers corresponding to at least two additional linked lists in the memory, wherein the at least two additional linked lists correspond to a second single logical data structure in the memory, and wherein the second plurality of pointers correspond to a second single requestor different from the first single requestor.

5. The buffer as recited in claim 2, wherein the single logical data structure is a single logical queue, and wherein
    in response to a write request, the control logic is configured to use a tail pointer identifying a tail of the single logical queue to enqueue data corresponding to the write request; and
    in response to a read request, the control logic is configured to use a head pointer identifying a head of the single logical queue to dequeue data from a given entry of the single logical data structure corresponding to the read request, wherein the given entry includes a requestor identification that is to receive a result of the read request.

6. The buffer as recited in claim 2, wherein the single logical data structure is a single logical queue, and wherein to read a plurality of entries of the single logical queue, the control logic is configured to:
    retrieve a first entry of the single logical queue identified by a first head pointer of the at least two head pointers and update the first head pointer to identify a location identified by a pointer stored in the first entry; and
    retrieve a second entry of the single logical queue identified by a second head pointer of the at least two head pointers and update the second head pointer to identify a location identified by a pointer stored in the second entry.

7. The buffer as recited in claim 1, wherein each entry of the single logical data structure further identifies a storage location in a cache.

8. The buffer as recited in claim 1, wherein the control logic is further configured to keep a count of valid entries of the single logical data structure.

9. The buffer as recited in claim 8, wherein the control logic is configured to increment said count each time an entry is allocated for the single logical data structure, and decrement the count each time an entry is retrieved from the single logical data structure.

10. A method comprising:
    storing entries of one or more data structures in a memory comprising a plurality of storage locations;
    storing at least two head pointers and two tail pointers corresponding to at least two linked lists in the memory, wherein the first plurality of pointers correspond to a first single requestor, wherein the at least two linked lists correspond to a single logical data structure in the memory, wherein each entry of the single logical data structure is configured to store a requestor identifier of the first single requestor; and
    alternating between the at least two linked lists when accessing the single logical queue in the memory.

11. The method as recited in claim 10, wherein only one of the at least two head pointers identifies a head of the single logical data structure, and only one of the at least two tail pointers identifies a tail of the single logical data structure.

12. The method as recited in claim 10, wherein the single logical data structure is one of a single logical queue and a single logical stack.

13. The method as recited in claim 10, wherein the buffer further comprises a second plurality of pointers configured to store at least two head pointers and two tail pointers corresponding to at least two additional linked lists in the memory, wherein the at least two additional linked lists correspond to a second single logical data structure in the memory, and wherein the second plurality of pointers correspond to a second single requestor different from the first single requestor.

14. The method as recited in claim 11, wherein the single logical data structure is a single logical queue, and wherein
    in response to a write request, the method further comprises using a tail pointer identifying a tail of the single logical queue to enqueue data corresponding to the write request; and
    in response to a read request, the method further comprises using a head pointer identifying a head of the single logical queue to dequeue data from a given entry of the single logical data structure corresponding to the read request, wherein the given entry includes a requestor identification that is to receive a result of the read request.

15. The method as recited in claim 11, wherein the single logical data structure is a single logical queue, and wherein to read a plurality of entries of the single logical queue, the method further comprises:
    retrieving a first entry of the single logical queue identified by a first head pointer of the at least two head pointers and update the first head pointer to identify a location identified by a pointer stored in the first entry; and
    retrieving a second entry of the single logical queue identified by a second head pointer of the at least two head pointers and update the second head pointer to identify a location identified by a pointer stored in the second entry.

16. The method as recited in claim 10, wherein each entry of the single logical data structure further identifies a storage location in a cache.

17. A non-transitory computer readable storage medium comprising program instructions operable to maintain information of pending operations in a computing system, wherein the program instructions are executable by a processor to:
    store entries of one or more data structures in a memory comprising a plurality of storage locations;
    store at least two head pointers and two tail pointers corresponding to at least two linked lists in the memory, wherein the first plurality of pointers correspond to a first single requestor, wherein the at least two linked lists correspond to a single logical data structure in the memory, wherein each entry of the single logical data structure is configured to store a requestor identifier of the first single requestor; and
    alternate between the at least two linked lists when accessing the single logical queue in the memory.

18. The non-transitory computer readable storage medium as recited in claim 17, wherein only one of the at least two head pointers identifies a head of the single logical data structure, and only one of the at least two tail pointers identifies a tail of the single logical data structure.

19. The non-transitory computer readable storage medium as recited in claim 17, wherein the single logical data structure is one of a single logical queue and a single logical stack.

20. The non-transitory computer readable storage medium as recited in claim 17, wherein the buffer further comprises a second plurality of pointers configured to store at least two head pointers and two tail pointers corresponding to at least two additional linked lists in the memory, wherein the at least two additional linked lists correspond to a second single logical data structure in the memory, and wherein the second plurality of pointers correspond to a second single requestor different from the first single requestor.

* * * * *